US010935181B2

(12) United States Patent
Wang et al.

(10) Patent No.: US 10,935,181 B2
(45) Date of Patent: Mar. 2, 2021

(54) STAND DEVICE

(71) Applicants: Chen-Cheng Wang, Taipei (TW); Sheng-Hung Lee, Taipei (TW); Po-Jui Chen, Taipei (TW); Yi-Hsuan Chen, Taipei (TW); Yen-Hua Hsiao, Taipei (TW)

(72) Inventors: Chen-Cheng Wang, Taipei (TW); Sheng-Hung Lee, Taipei (TW); Po-Jui Chen, Taipei (TW); Yi-Hsuan Chen, Taipei (TW); Yen-Hua Hsiao, Taipei (TW)

(73) Assignee: COMPAL ELECTRONICS, INC., Taipei (TW)

(*) Notice: Subject to any disclaimer, the term of this patent is extended or adjusted under 35 U.S.C. 154(b) by 0 days.

(21) Appl. No.: 16/408,478

(22) Filed: May 10, 2019

(65) Prior Publication Data

US 2019/0346080 A1 Nov. 14, 2019

Related U.S. Application Data

(60) Provisional application No. 62/671,416, filed on May 14, 2018.

(51) Int. Cl.
*F16M 11/00* (2006.01)
*F16M 11/38* (2006.01)
(Continued)

(52) U.S. Cl.
CPC ........... *F16M 11/38* (2013.01); *F16M 11/045* (2013.01); *F16M 11/046* (2013.01); *F16M 11/10* (2013.01)

(58) Field of Classification Search
CPC .. H04B 1/3877; G06F 1/1679; H04M 1/0239; F16M 13/00; F16M 13/022
See application file for complete search history.

(56) References Cited

U.S. PATENT DOCUMENTS 8,230,992 B2 * 7/2012 Law ...................... G06F 1/1626
206/320
2009/0104942 A1 * 4/2009 Arakane ............... G06F 1/1679
455/566
(Continued)

FOREIGN PATENT DOCUMENTS

CN 201992281 9/2011
CN 205640096 10/2016

OTHER PUBLICATIONS

"Office Action of Taiwan Counterpart Application," dated Aug. 23, 2019, p. 1-p. 10.
(Continued)

*Primary Examiner* — Amy J. Sterling
(74) *Attorney, Agent, or Firm* — JCIPRNET

(57) ABSTRACT

A stand device includes a base, a supporting component and a carrying component. The supporting component is pivotally disposed to the base along a first axis. The carrying component is pivotally disposed to the supporting component along a second axis, and slidably disposed to the supporting component in a first direction. The stand device is switchable between a first state and a second state. In the first state, the extending direction of the supporting component is parallel to the extending direction of the base, and the extending direction of the carrying component is parallel to the extending direction of the supporting component. In the second state, the extending direction of the supporting component is staggered to the extending direction of the base, and the extending direction of the carrying component is staggered to the extending direction of the supporting component.

13 Claims, 11 Drawing Sheets

(51) Int. Cl.
*F16M 11/10* (2006.01)
*F16M 11/04* (2006.01)

(56) References Cited

U.S. PATENT DOCUMENTS

| | | | |
|---|---|---|---|
| 2011/0143818 A1* | 6/2011 | Makino | H04M 1/0247 455/566 |
| 2011/0221319 A1 | 9/2011 | Law et al. | |
| 2012/0170212 A1* | 7/2012 | Gallouzi | G06F 1/1632 361/679.56 |

OTHER PUBLICATIONS

"Office Action of China Counterpart Application", dated Aug. 5, 2020, p. 1-p. 7.

* cited by examiner

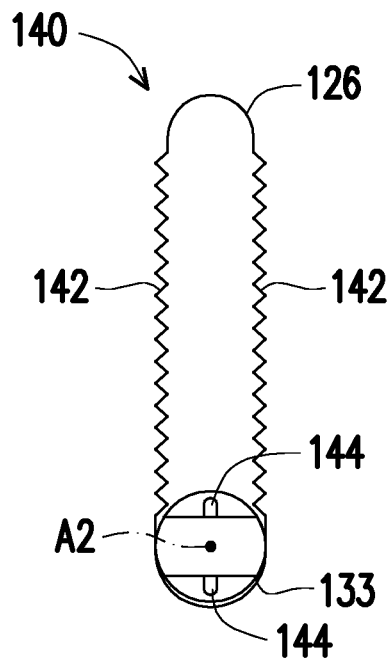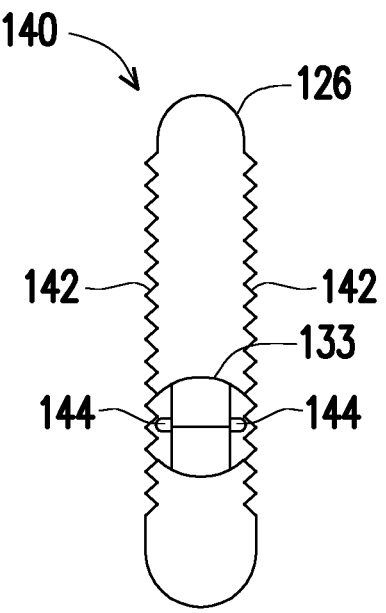
FIG. 8A    FIG. 8B
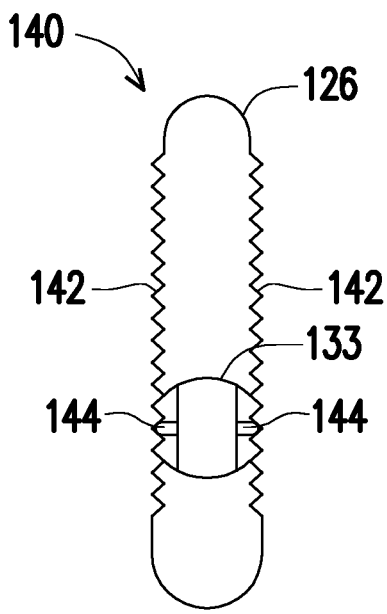
FIG. 8C

STAND DEVICE

CROSS REFERENCE TO RELATED APPLICATION

This application claims the priority benefit of U.S. provisional application Ser. No. 62/671,416, filed on May 14, 2018. The entirety of the above-mentioned patent application is hereby incorporated by reference herein and made a part of specification.

BACKGROUND

Technical Field

The disclosure relates to a stand device, and more particularly relates to a stand device configured to carry at least one electronic apparatus.

Description of Related Art

At present, the stand devices exclusively designed for electronic apparatuses are mainly configured to elevate the electronic apparatuses and adjust angles of the electronic apparatuses, but such stand devices do not provide any mechanism for fine adjustment for adjusting the horizontal position and the vertical position of the electronic apparatuses. Besides, most of the existing stand devices have large volume, and thus, it is not convenient to carry these stand devices. Therefore, the existing stand devices fail to deliver favorable convenience.

SUMMARY

The disclosure provides a stand device to solve problems of existing stand devices exclusively configured for electronic apparatuses including the problem of lack of a fine adjustment mechanism for adjusting a horizontal position and a vertical position of an electronic apparatus and the problem of large volume which prevents the stand devices to be carried around conveniently.

The disclosure provides a stand device including a base, a supporting component, and a carrying component. The supporting component is pivotally disposed to the base along a first axis. The carrying component is pivotally disposed to the supporting component along a second axis and slidably disposed to the supporting component in a first direction. The stand device is switchable between a first state and a second state. In the first state, an extending direction of the supporting component is parallel to an extending direction of the base, and an extending direction of the carrying component is parallel to the extending direction of the supporting component. In the second state, the extending direction of the supporting component is staggered to the extending direction of the base, the extending direction of the carrying component is staggered to the extending direction of the supporting component, and the stand device is configured to carry at least one electronic apparatus.

In an embodiment of the disclosure, the first axis, the second axis, and the first direction are perpendicular to one another.

In an embodiment of the disclosure, the extending direction of the base and the extending direction of the supporting component are both perpendicular to the first axis. In the first state, the extending direction of the carrying component is perpendicular to the first axis. In the second state, the extending direction of the carrying component is parallel to the first axis.

In an embodiment of the disclosure, the extending direction of the supporting component and the extending direction of the carrying component are both perpendicular to the second axis. In the first state, the extending direction of the base is perpendicular to the second axis. In the second state, the extending direction of the base is staggered to the second axis or parallel to the second axis.

In an embodiment of the disclosure, the extending direction of the supporting component is parallel to the first direction. In the first state, the extending direction of the base and the extending direction of the carrying component are both parallel to the first direction. In the second state, the extending direction of the base is staggered to the first direction or perpendicular to the first direction. Further, the extending direction of the carrying component is perpendicular to the first direction.

In an embodiment of the disclosure, in the second state, the extending direction of the carrying component is perpendicular to the extending direction of the supporting component.

In an embodiment of the disclosure, the carrying component includes a rotating sliding element and a carrying element. The rotating sliding element is disposed to the supporting component along the second axis, and is slidably disposed to the supporting component in the first direction. The carrying element is slidably disposed to the rotating sliding element in a second direction.

In an embodiment of the disclosure, the second direction is perpendicular to the second axis. In the first state, the second direction is perpendicular to the first axis and parallel to the first direction. In the second state, the second direction is parallel to the first axis and perpendicular to the first direction.

In an embodiment of the disclosure, the supporting component includes a supporting element and a sliding groove. The supporting element is pivotally disposed to the base along the first axis. The sliding groove is formed on the supporting element in the first direction. The carrying component further includes a bump. The bump is disposed on the rotating sliding element. The bump is pivotally disposed to the sliding groove along the second axis, such that the carrying component pivots with respect to the supporting component along the second axis. The bump is slidably disposed to the sliding groove in the first direction, such that the carrying component slides with respect to the supporting component in the first direction.

In an embodiment of the disclosure, the carrying component further includes a sliding rail and a sliding block. The sliding rail is disposed on the rotating sliding element. The sliding block is disposed on the carrying element, and is slidably disposed in the sliding rail in the second direction.

In an embodiment of the disclosure, the carrying component includes a first positioning portion disposed on the sliding block. The at least one electronic apparatus includes a second positioning portion matched with the first positioning portion.

In an embodiment of the disclosure, in the second state, the at least one electronic apparatus is carried on the carrying element. The supporting component may rotate along the first axis so that an angle of the at least one electronic apparatus relative to the base is adjusted. The rotating sliding element may slides up and down relative to the supporting component in the first direction so that a height of the at least one electronic apparatus relative to the base is adjusted. The carrying element may slides left and right relative to the rotating sliding element in the second direction so that a horizontal position of the at least one electronic apparatus relative to the rotating sliding element is adjusted.

In an embodiment of the disclosure, the stand device further includes a positioning mechanism. The positioning mechanism is disposed between the supporting component and the carrying component and is configured to limit rotation of the carrying component relative to the supporting component along the second axis and sliding of the carrying component relative to the supporting component in the first direction.

In an embodiment of the disclosure, the supporting component has a sliding groove. The carrying component has a bump. The bump is pivotally disposed to the sliding groove along the second axis and is slidably disposed to the sliding groove in the first direction. The positioning mechanism includes two toothed portions, two latches, and an actuator. The toothed portions are disposed at two opposite sides of the sliding groove. The latches are disposed at the bump and are configured to extend to be engaged with the two toothed portions or retract to release engagement with the two toothed portions. The actuator is slidably disposed to the carrying component and is configured to actuate the two latches to extend or retract.

In view of the above, in the stand device provided by the disclosure, the fine adjustment mechanism adjusting the horizontal position and the vertical position of the electronic apparatus carried on the stand device is provided, and it is convenient to carry the entire stand device.

To make the aforementioned more comprehensible, several embodiments accompanied with drawings are described in detail as follows.

BRIEF DESCRIPTION OF THE DRAWINGS

FIG. 8A to FIG. 8C are schematic views illustrating a positioning mechanism of the stand device of FIG. 2.

DESCRIPTION OF THE EMBODIMENTS

Figure 1:
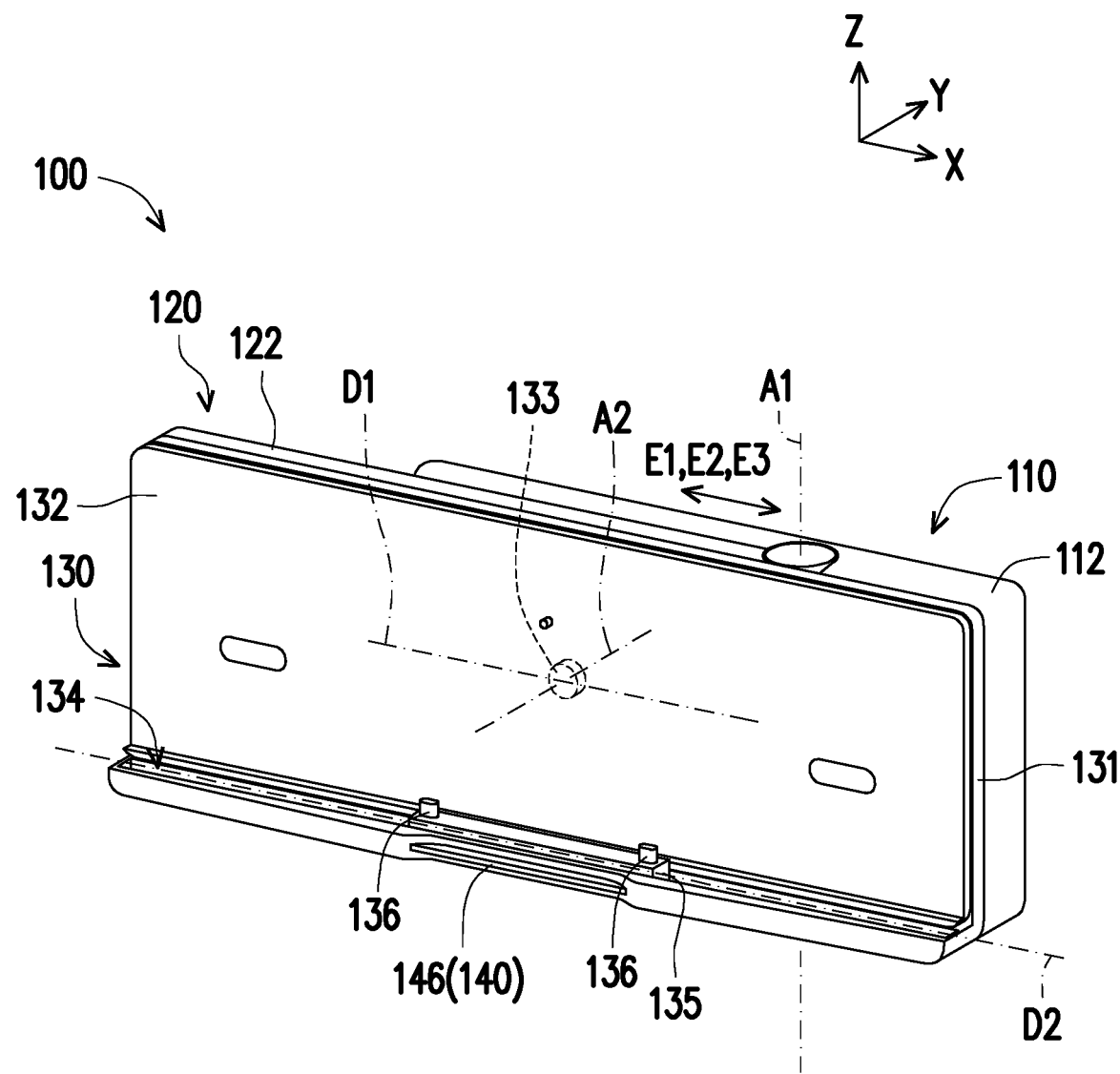
FIG. 1 is a schematic three-dimensional view of a stand device in a first state according to an embodiment of the disclosure.
Figure 2:
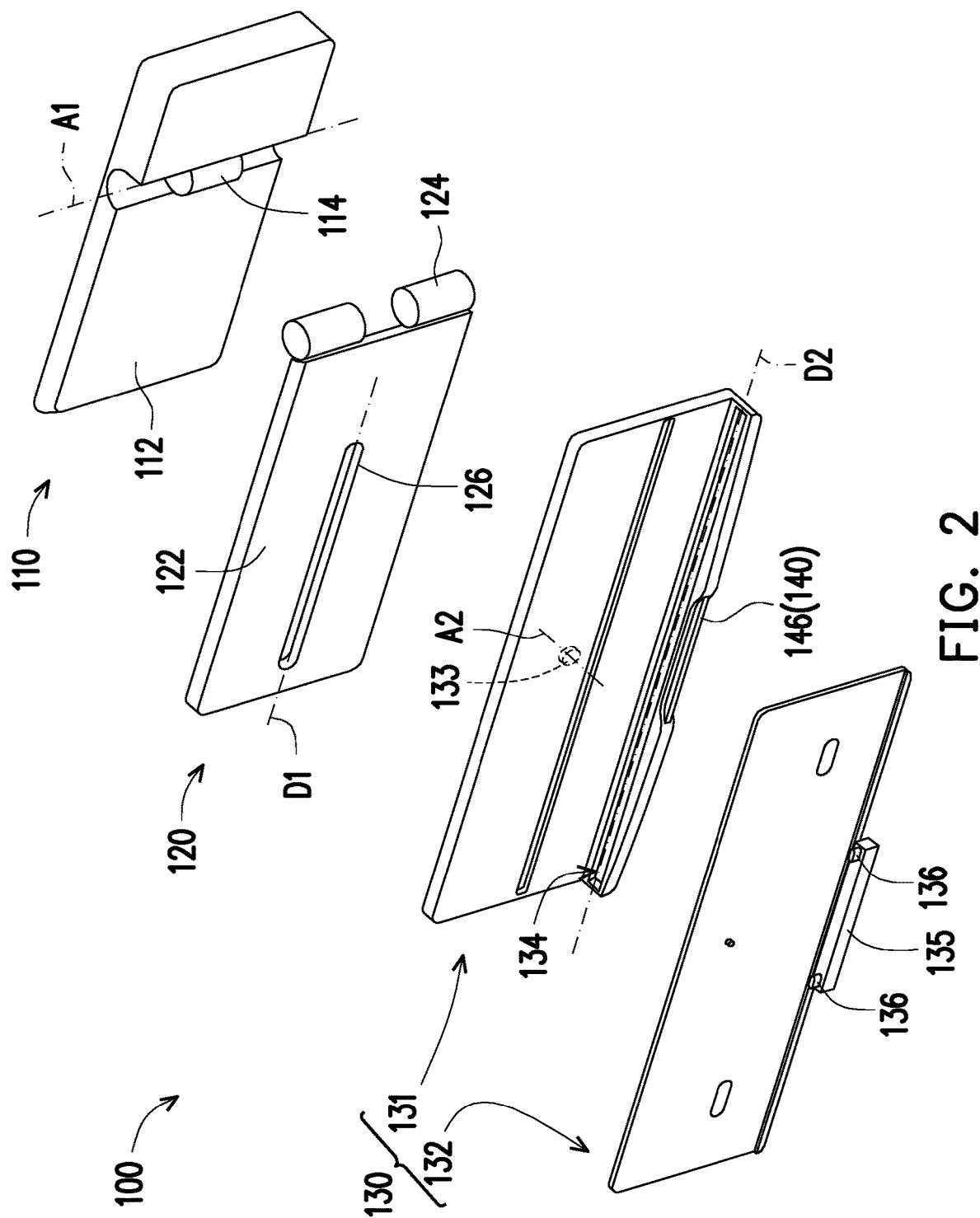
FIG. 2 is a schematic exploded view of the stand device of FIG. 1.
Figure 3:
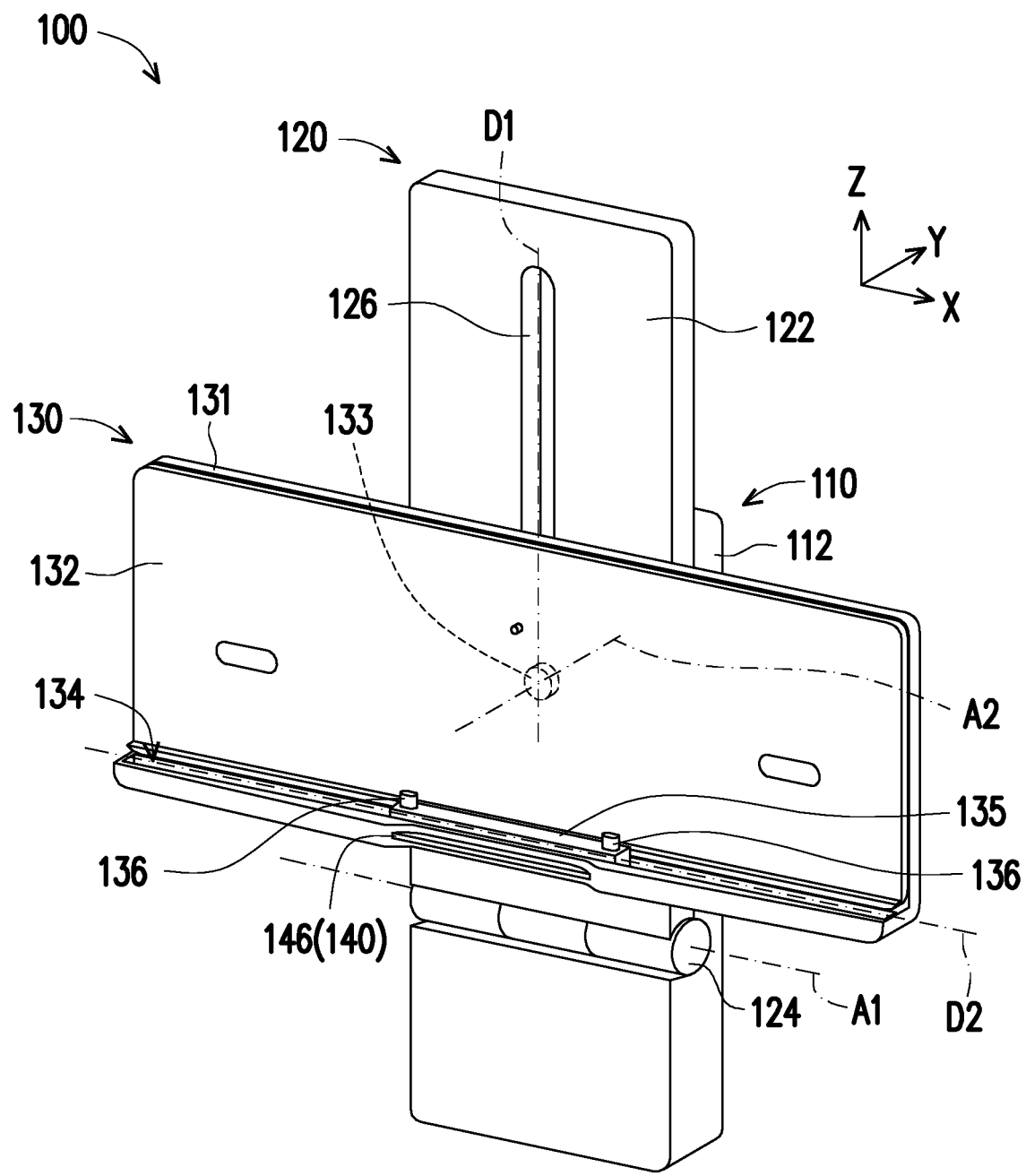
FIG. 3 is a schematic three-dimensional view of a carrying component after pivoting along a second axis in the stand device of FIG. 1.
Figure 4:
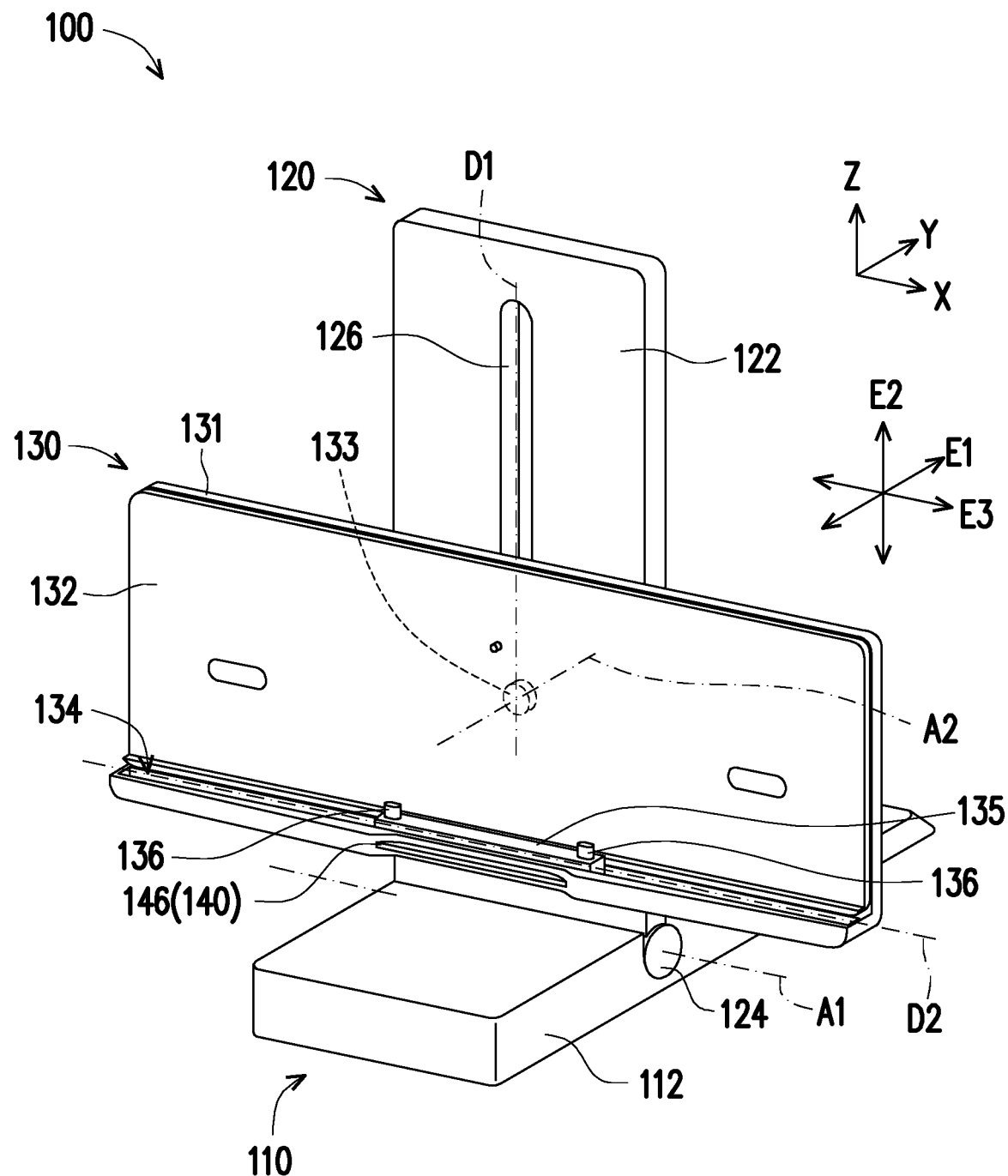
FIG. 4 is a schematic three-dimensional view of a supporting component after pivoting along a first axis in the stand device of FIG. 3.

FIG. 1 is a schematic three-dimensional view of a stand device 100 in a first state according to an embodiment of the disclosure. FIG. 2 is a schematic exploded view of the stand device 100 of FIG. 1. FIG. 3 is a schematic three-dimensional view of a carrying component 130 after pivoting along a second axis A2 in the stand device 100 of FIG. 1. FIG. 4 is a schematic three-dimensional view of a supporting component 120 after pivoting along a first axis A1 in the stand device 100 of FIG. 3. With reference to FIG. 1, FIG. 2, FIG. 3, and FIG. 4, the stand device 100 of this embodiment includes a base 110, the supporting component 120, and the carrying component 130.

To be specific, the supporting component 120 is pivotally disposed to the base 110 along the first axis A1. The carrying component 130 is pivotally disposed to the supporting component 120 along the second axis A2 and slidably disposed to the supporting component 120 in a first direction D1.

In FIG. 1, an extending direction E1 of the base 110, an extending direction E2 of the supporting component 120, and an extending direction E3 of the carrying component 130 are parallel to one another, and such state is defined as the first state, that is, a received state.

In FIG. 4, the extending direction E1 of the base 110, the extending direction E2 of the supporting component 120, and the extending direction E3 of the carrying component 130 are staggered to one another, and such state is defined as a second state, that is, an in-use state. The stand device 100 is the second state is configured to carry at least one electronic apparatus.

The stand device 100 is switchable between the first state shown in FIG. 1 and the second state shown in FIG. 4. In other words, the stand device 100 is switchable between the received state and the in-use state.

Through the foregoing arrangement, when the stand device 100 is in the second state as shown in FIG. 4, the electronic apparatus is carried on the stand device 100, and fine adjustment may be made to a horizontal position and a vertical position of the electronic apparatus relative to the base 110, so that a user may enjoy a more convenient using experience when using the electronic apparatus. In addition, when the stand device 100 is in the first state shown in FIG. 1, the entire stand device 100 is received and occupies less space and thus may be conveniently carried around by a user.

To be specific, the base 110 includes a seat portion 112 and a first pivot shaft 114. The first pivot shaft 114 is disposed at the seat portion 112 and extends along the first axis A1.

In other embodiments, a charging cable may be connected to the base, so that a power source is provided to the electronic apparatus.

In other embodiments, a wireless charging module may be disposed at the base, so that a power source is provided to the electronic apparatus.

Furthermore, the supporting component 120 includes a supporting element 122, a second pivot shaft 124, and a sliding groove 126. The second pivot shaft 124 is disposed at the supporting element 122. The second pivot shaft 124 is pivotally disposed to the first pivot shaft 114, so that the supporting component 120 may pivot relative to the base 110 along the first axis A1. The sliding groove 126 extends in the first direction D1 and is formed on the supporting element 122.

Herein, the first pivot shaft 114 and the second pivot shaft 124 may be tightly matched to be pivotally connected to each other. In other words, the supporting component 120 may be secured to any positions relative to the base 110. A user may adjust an unfolding angle of the supporting component relative to the base 110 according to needs and thereby may enjoy a convenient using experience.

In addition, the carrying component 130 includes a rotating sliding element 131, a carrying element 132, a bump 133, a sliding rail 134, a sliding block 135, and a first positioning portion 136.

Specifically, the bump 133 is disposed on the rotating sliding element 131. The bump 133 is pivotally disposed to the sliding groove 126 of the supporting component 120 along the second axis A2, so that the carrying component 130 may pivot relative to the supporting component 120 along the second axis A2 so as to pivot between the positions shown in FIG. 1 and FIG. 3.

Figure 5:
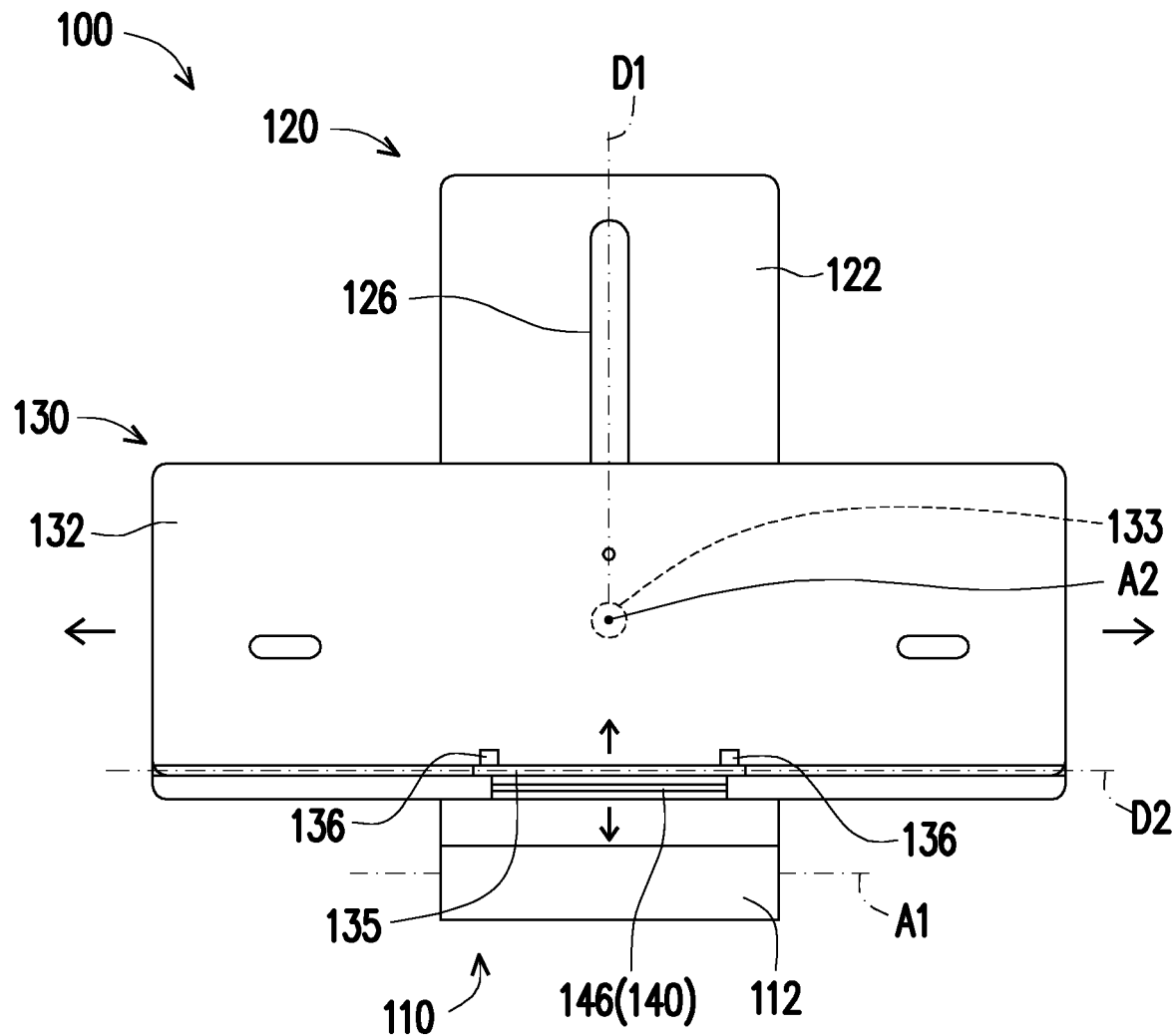
FIG. 5 is a schematic front view of the stand device of FIG. 4.
Figure 6:
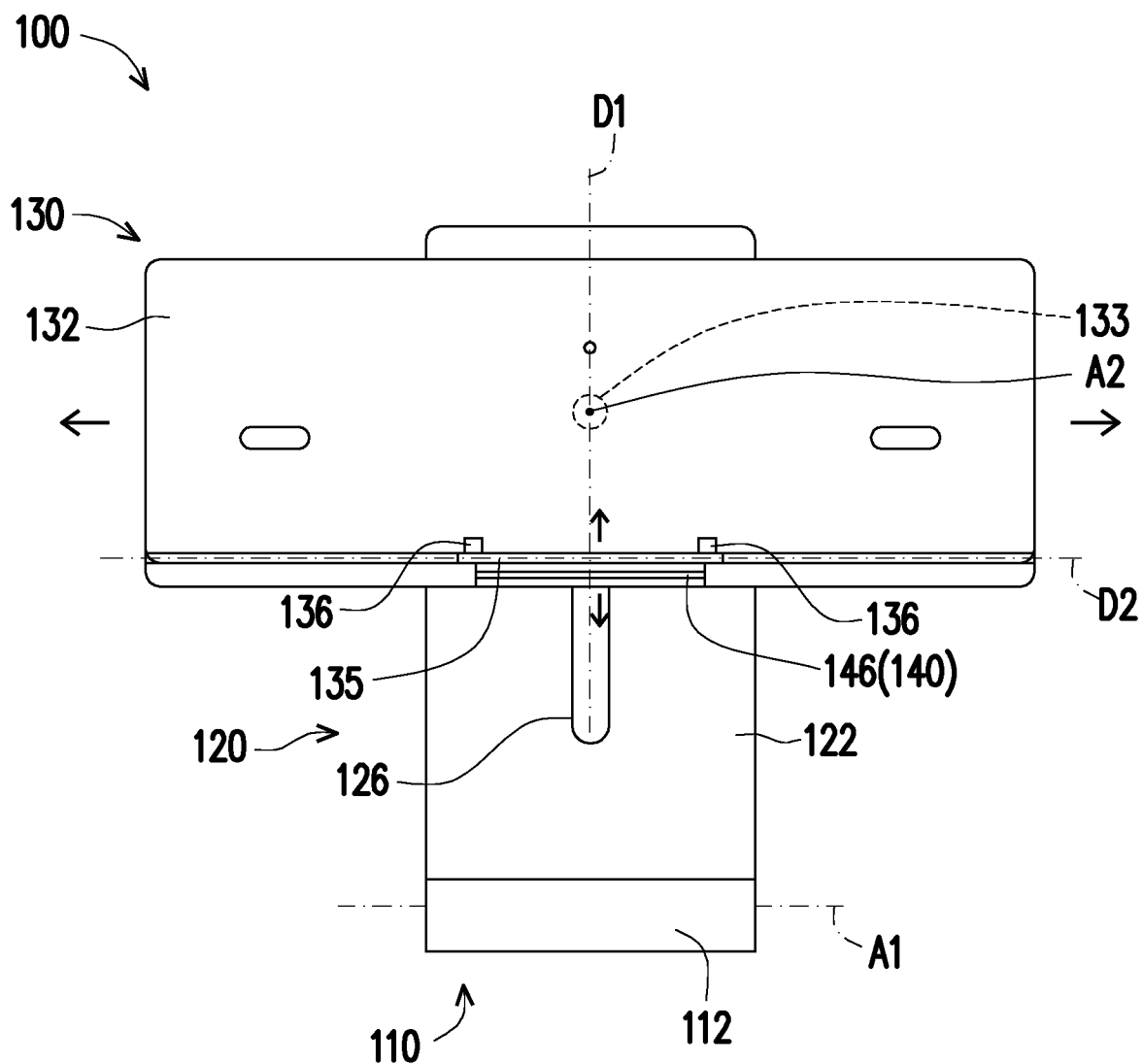
FIG. 6 is a schematic front view of the carrying component after sliding in a first direction in the stand device of FIG. 5.

FIG. 5 is a schematic front view of the stand device 100 of FIG. 4. FIG. 6 is a schematic front view of the carrying component 130 after sliding in the first direction D1 in the stand device 100 of FIG. 5. With reference to FIG. 2, FIG. 5, and FIG. 6, the bump 133 is slidably disposed to the sliding groove 126 of the supporting component 120 in the first direction D1, so that the carrying component 130 may slide back and forth relative to the supporting component 120 between positions of FIG. 5 and FIG. 6 in the first direction D1.

Figure 7:
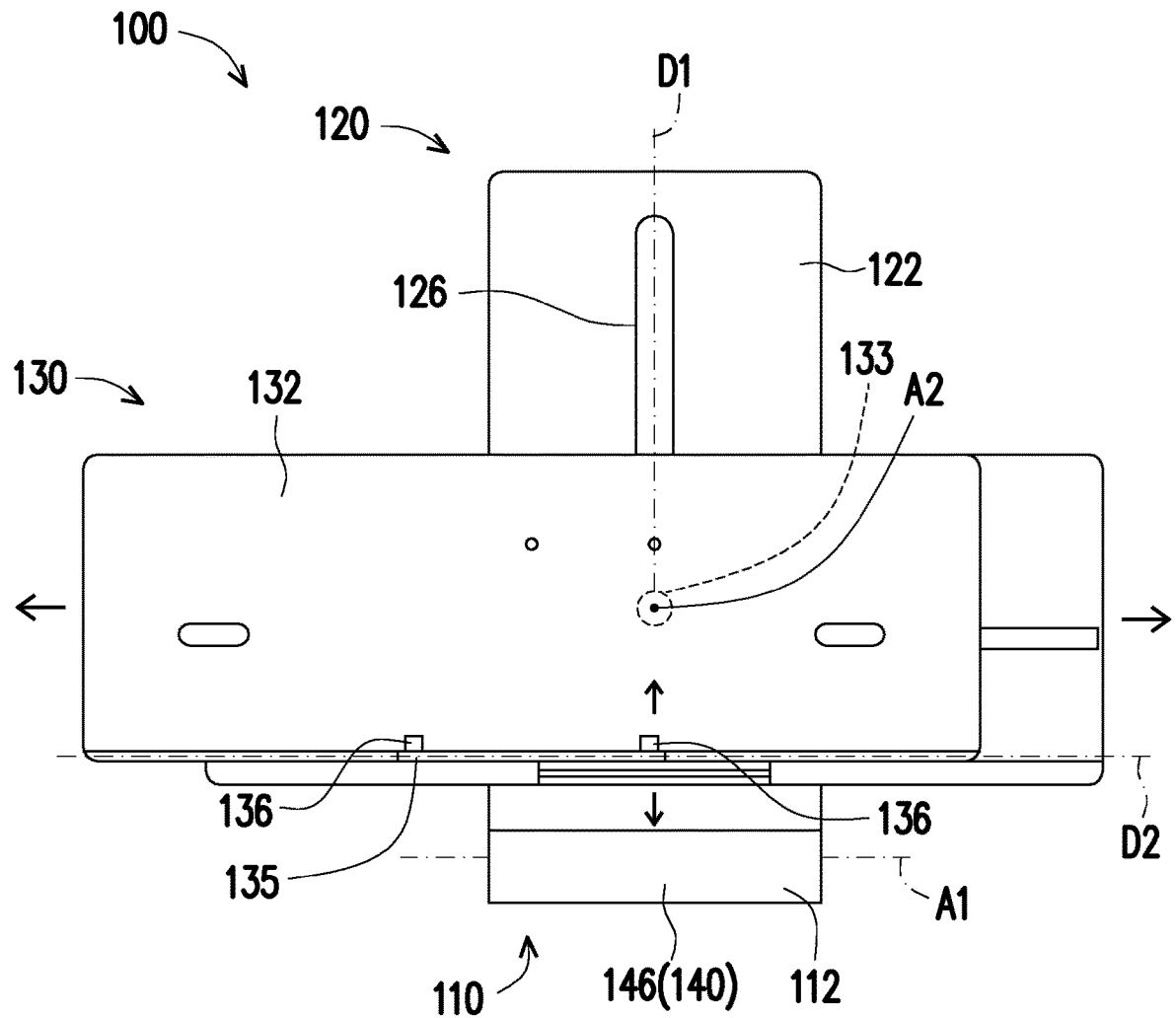
FIG. 7 is a schematic front view of a carrying element after sliding relative to a rotating sliding element in a second direction in the carrying component of FIG. 5.

FIG. 7 is a schematic front view of the carrying element 132 after sliding relative to the rotating sliding element 131 in a second direction D2 in the carrying component 130 of FIG. 5. With reference to FIG. 2, FIG. 5, and FIG. 7, the sliding rail 134 is disposed on the rotating sliding element 131 in the second direction D2. The sliding block 135 is disposed on the carrying element 132. The sliding block 135 is slidably disposed in the sliding rail 134 in the second direction D2, so that the carrying element 132 may slide back and forth relative to the rotating sliding element 131 between positions shown in FIG. 5 and FIG. 7 in the second direction D2.

In addition, the carrying element 132 is configured to carry the electronic apparatus. The first positioning portion 136 is disposed on the sliding block 135. In this embodiment, the carrying component 130 may not have to include the first positioning portion 136.

In order to provide concise description, FIG. 7 only illustrates that the carrying element 132 moves to the left relative to the rotating sliding element 131 in the second direction D2 in this embodiment, but in fact, the carrying element 132 may move to the right relative to the rotating sliding element 131 in the second direction D2. If required, a user can manipulate the carrying element 132 to slide to the right.

In this embodiment, the first axis A1, the second axis A2, and the first direction D1 are disposed to be perpendicular to one another. The second direction D2 is disposed to be perpendicular to the second axis A2. Nevertheless, the disclosure should not be construed as limited thereto.

As shown in FIG. 1 and FIG. 4, for convenience of description, an XYZ coordinate system is defined in FIG. 1 and FIG. 4. The extending direction E1 of the base 110 and the extending direction E2 of the supporting component 120 are both perpendicular to the first axis A1. The extending direction E2 of the supporting component 120 and the extending direction E3 of the carrying component 130 are both perpendicular to the second axis A2. The extending direction E2 of the supporting component 120 is parallel to the first direction D1. Nevertheless, the disclosure should not be construed as limited thereto.

In the first state shown in FIG. 1, the extending direction E1 of the base 110, the extending direction E2 of the supporting component 120, and the extending direction E3 of the carrying component 130 are all parallel to the X axis. The extending direction E3 of the carrying component 130 is perpendicular to the first axis A1. The extending direction E1 of the base 110 is perpendicular to the second axis A2. The extending direction E1 of the base 110 and the extending direction E3 of the carrying component 130 are both parallel to the first direction D1. The second direction D2 is perpendicular to the first axis A1 and is parallel to the first direction D1. Nevertheless, the disclosure should not be construed as limited thereto. The first axis A1 is parallel to the Z axis. The second axis A2 is parallel to the Y axis. The first direction D1 and the second direction D2 are both parallel to the X axis.

In the second state shown in FIG. 4, the extending direction E1 of the base 110 is parallel to the Y axis, the extending direction E2 of the supporting component 120 is parallel to the Z axis, and the extending direction E3 of the carrying component 130 is parallel to the X axis. The extending direction E3 of the carrying component 130 is parallel to the first axis A1. The extending direction E1 of the base 110 is staggered to the second axis A2 or parallel to the second axis A2. The extending direction E1 of the base 110 is staggered to the first direction D1 or perpendicular to the first direction D1, and the extending direction E3 of the carrying component 130 is perpendicular to the first direction D1. The extending direction E3 of the carrying component 130 is perpendicular to the extending direction E2 of the supporting component 120. The second direction D2 is parallel to the first axis A1 and is perpendicular to the first direction D1. Nevertheless, the disclosure should not be construed as limited thereto. The first axis A1 and the second axis A2 are both parallel to the X axis. The second axis A2 is parallel to the Y axis. The first direction D1 is parallel to the Z axis.

FIG. 8A to FIG. 8C are schematic views illustrating a positioning mechanism 140 of the stand device 100 of FIG. 2. With reference to FIG. 2, FIG. 5, and FIG. 8A, the stand device 100 further includes the positioning mechanism 140 disposed between the supporting component 120 and the carrying component 130.

Specifically, the positioning mechanism 140 includes two toothed portions 142, two latches 144, and an actuator 146. The two toothed portions 142 are disposed at two opposite sides of the sliding groove 126. The two latches 144 are disposed at the bump 133 and are configured to extend to be engaged with the two toothed portions 142 or retract to release engagement with the two toothed portions 142. The actuator 146 is slidably disposed to the carrying component 130 and is configured to actuate the two latches 144 to extend or retract.

In this embodiment, a mechanism converting movement of the actuator 146 into movement of the two latches 144 may be selected according to needs, and the related technique belongs to the conventional technique so that description thereof is not provided herein.

With reference to FIG. 1 and FIG. 8A, in the first state shown in FIG. 1, a diameter of the bump 133 is greater than a width between the two toothed portions 142, so the bump 133 can only pivot in the sliding groove 126 along the second axis A2 and cannot slide relative to the sliding groove 126 in the first direction D1. In other words, in the first state shown in FIG. 1, as being limited by the positioning mechanism 140, the carrying component 130 can only pivot relative to the supporting component 120 along the second axis A2 and cannot slide relative to the supporting component 120 in the first direction D1.

With reference to FIG. 1, FIG. 3, and FIG. 8B, after the carrying component 130 pivots from the state shown in FIG. 1 to the state shown in FIG. 3 along the second axis A2, the actuator 146 is enabled to slide up or slide down, so that the latches 144 are linked with the actuator 146 to retract to release the engagement with the two toothed portions 142. At this time, the carrying component 130 may thereby slide back and forth relative to the supporting component 120 in the first direction D1. The carrying component 130 may slide back and forth at the positions shown in FIG. 5 and FIG. 6, and when no force is applied to the actuator 146, the two latches 144 are engaged with the toothed portions 142 as shown in FIG. 8C, and that the carrying component 130 is positioned at a specific height.

In other words, the positioning mechanism 140 is configured to limit rotation of the carrying component 130 relative to the supporting component 120 along the second axis A2 and is configured to limit sliding of the carrying component 130 relative to the supporting component 120 in the first direction D1.

Figure 9:
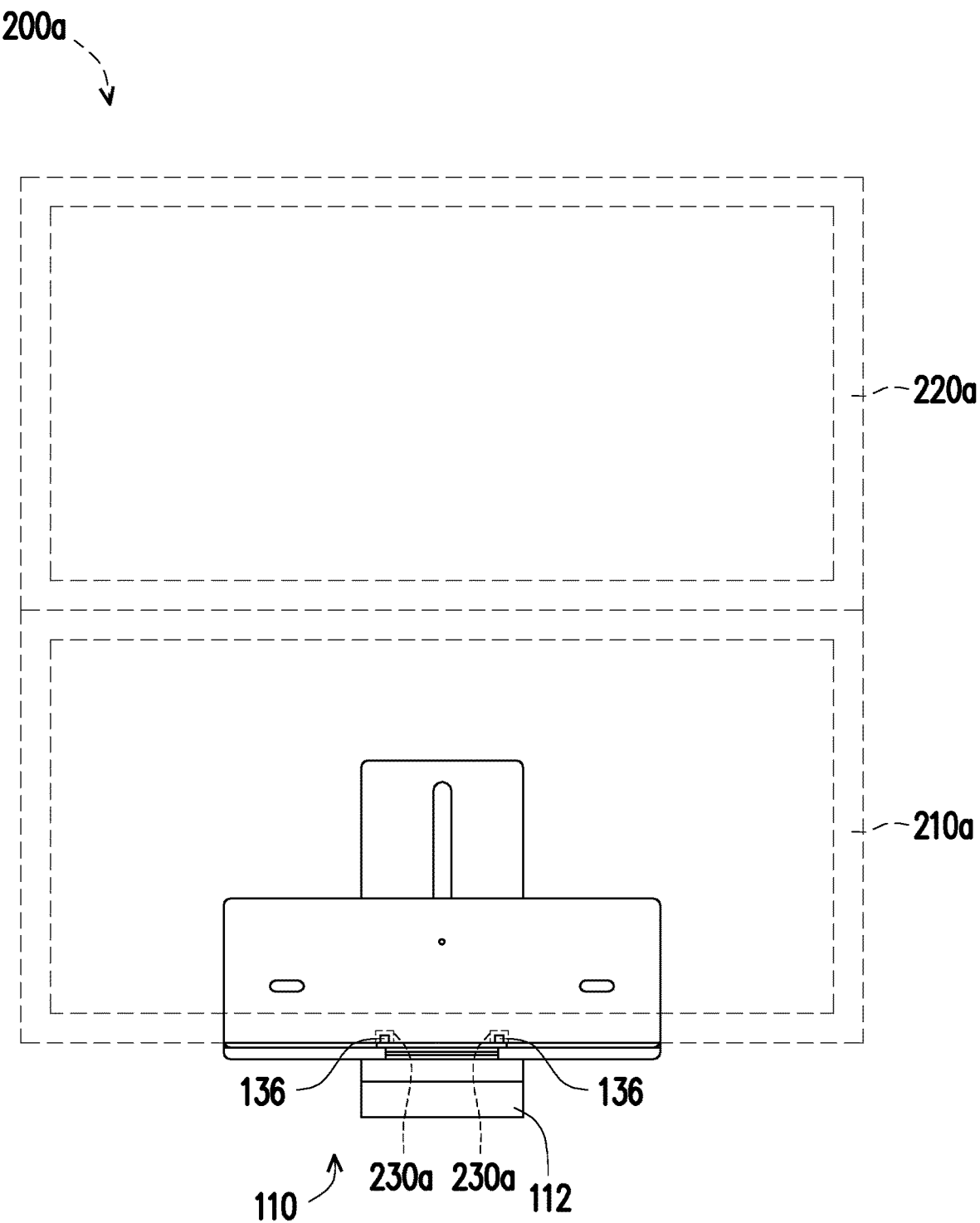
FIG. 9 is a schematic view illustrating an in-use state of the stand device of FIG. 5 carrying an electronic apparatus.

FIG. 9 is a schematic view illustrating the in-use state of the stand device of FIG. 5 carrying an electronic apparatus. With reference to FIG. 9, when the stand device 100 is in the state shown in FIG. 9, an electronic apparatus 200a may be vertically carried on the carrying component 130. The electronic apparatus 200a includes a first portion 210a, a second portion 220a, and a second positioning portion 230a. Both the first portion 210a and the second portion 220a may be tablet computers and may be assembled into a large electronic apparatus by using an added device, so that a larger display image may be provided. The second positioning portion 230a is disposed on the first portion 210a and has a shape matched with that of the first positioning portion 136. In this embodiment, the carrying component 130 may not be required to include the first positioning portion 136, and the first portion 210a may not be required to include the second positioning portion 230a. In other words, the electronic apparatus 200a may directly be carried on the carrying component 130 without using the first positioning portion 136 and the second positioning portion 230a for positioning. Accordingly, the stand device 100 may provide a user with a visual experience of a greater height.

Figure 10:
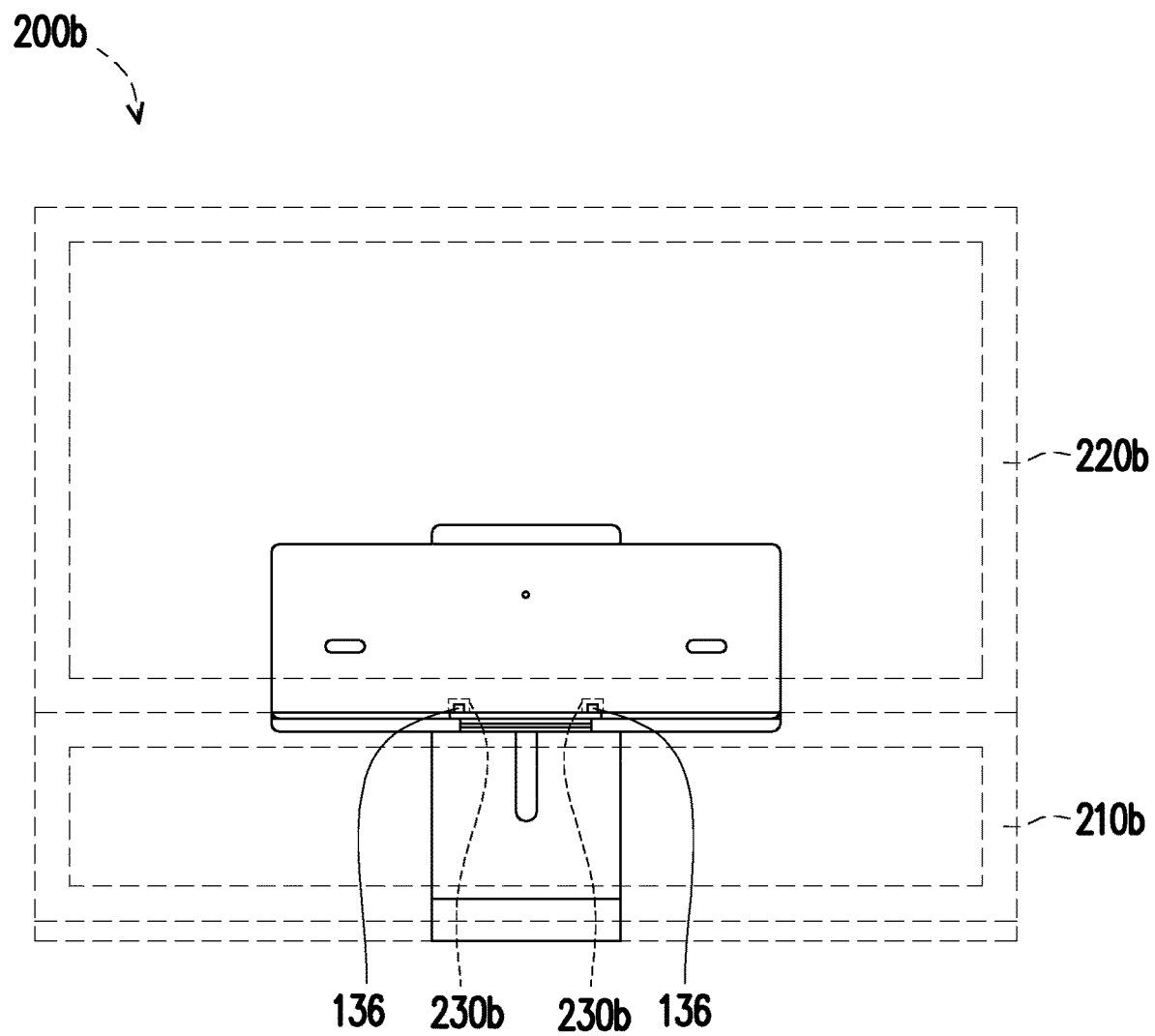
FIG. 10 is a schematic view illustrating the in-use state of the stand device of FIG. 6 carrying another electronic apparatus.

FIG. 10 is a schematic view illustrating the in-use state of the stand device of FIG. 6 carrying another electronic apparatus. With reference to FIG. 10, when the stand device 100 is in the state shown in FIG. 10, an electronic apparatus 200b may be vertically carried on the carrying component 130. The electronic apparatus 200b includes a first portion 210b, a second portion 220b, and a second positioning portion 230b. Both the first portion 210b and the second portion 220b may be tablet computers and may be assembled into a large electronic apparatus by using an added device, so that a larger display image may be provided. The second positioning portion 230b is disposed on the second portion 220b and has a shape matched with that of the first positioning portion 136. In this embodiment, the carrying component 130 may not be required to include the first positioning portion 136, and the second portion 220b may not be required to include the second positioning portion 230b. In other words, the electronic apparatus 200b may directly be carried on the carrying component 130 without using the first positioning portion 136 and the second positioning portion 230b for positioning. Accordingly, the stand device 100 may provide a user with a different usage scenario.

Figure 11:
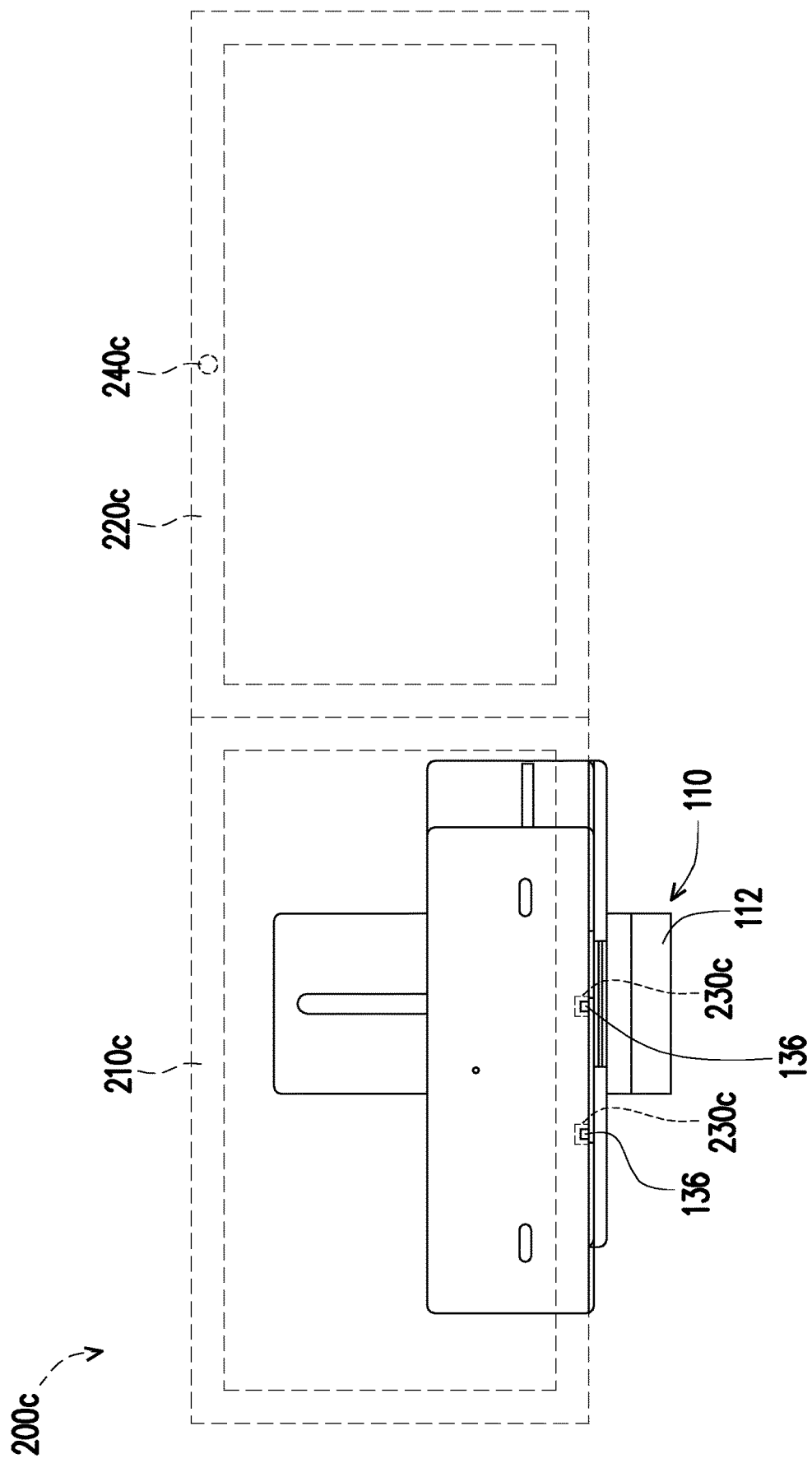
FIG. 11 is a schematic view illustrating the in-use state of the stand device of FIG. 7 carrying yet another electronic apparatus.

FIG. 11 is a schematic view illustrating the in-use state of the stand device of FIG. 7 carrying yet another electronic apparatus. With reference to FIG. 11, when the stand device 100 is in the state shown in FIG. 11, an electronic apparatus 200c may be horizontally carried on the carrying component 130. The electronic apparatus 200c includes a first portion 210c, a second portion 220c, a second positioning portion 230c, and a camera module 240c. Both the first portion 210c and the second portion 220c may be tablet computers and may be assembled into a large electronic apparatus by using an added device, so that a larger display image may be provided. The second positioning portion 230c is disposed on the first portion 210c and has a shape matched with that of the first positioning portion 136. The camera module 240c is disposed at the second portion 220c. In this embodiment, the carrying component 130 may not be required to include the first positioning portion 136, and the first portion 210c may not be required to include the second positioning portion 230c. In other words, the electronic apparatus 200c may directly be carried on the carrying component 130 without using the first positioning portion 136 and the second positioning portion 230c for positioning. Accordingly, the stand device 100 may provide a user with more different usage scenarios.

In this embodiment, only a few usage scenarios of using the stand device 100 to carry an electronic apparatus are schematically illustrated in FIG. 9, FIG. 10, and FIG. 11, and the stand device 100 of this embodiment may be used by a user according to needs. For instance, in the second state, an electronic apparatus may be carried on the carrying element 132. The supporting component 120 may rotate along the first axis A1 so that an angle of the electronic apparatus relative to the base 110 is adjusted. The rotating sliding element 131 may slide up and down relative to the supporting component 120 in the first direction D1 so that a height of the electronic apparatus relative to the base 110 is adjusted. The carrying element 132 may slide left and right relative to the rotating sliding element 131 in the second direction D2 so that a horizontal position of the electronic apparatus relative to the rotating sliding element 131 is adjusted. Accordingly, the stand device 100 is suitable for a variety of different electronic apparatuses and may provide a variety of different usage scenarios, so that the user may enjoy a more convenient using experience when using the electronic apparatus.

In view of the foregoing, in the stand device provided by the disclosure, when the stand device is in the second state, the electronic apparatus may be carried on the stand device, and fine adjustment may be made to the horizontal position and the vertical position of the electronic apparatus relative to the base, so that the user may enjoy a more convenient experience when using the electronic apparatus. In addition, when the stand device is in the first state, the entire stand device is received and occupies less space and thus may be conveniently carried around by the user.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A stand device, comprising:
   a base;
   a supporting component, pivotally disposed to the base along a first axis; and
   a carrying component, pivotally disposed to the supporting component along a second axis, and slidably disposed to the supporting component in a first direction, wherein the stand device is switchable between a first state and a second state, in the first state, an extending direction of the supporting component is parallel to an extending direction of the base, and an extending direction of the carrying component is parallel to the extending direction of the supporting component, and in the second state, the extending direction of the supporting component is staggered to the extending direction of the base, the extending direction of the carrying component is staggered to the extending direction of the supporting component, and the stand device is configured to carry at least one electronic apparatus, wherein the supporting component comprises a supporting element and a sliding groove, the supporting element is pivotally disposed to the base along the first axis, the sliding groove is formed on the supporting element in the first direction, the carrying component further comprises a bump pivotally disposed to the sliding groove along the second axis, such that the carrying component pivots with respect to the supporting component along the second axis, and the bump is slidably disposed to the sliding groove in the first direction, such that the carrying component slides with respect to the supporting component in the first direction.

2. The stand device as claimed in claim 1, wherein the first axis, the second axis, and the first direction are perpendicular to one another.

3. The stand device as claimed in claim 1, wherein the extending direction of the base and the extending direction of the supporting component are both perpendicular to the first axis, in the first state, the extending direction of the carrying component is perpendicular to the first axis, and in the second state, the extending direction of the carrying component is parallel to the first axis.

4. The stand device as claimed in claim 1, wherein the extending direction of the supporting component and the extending direction of the carrying component are both perpendicular to the second axis, in the first state, the extending direction of the base is perpendicular to the second axis, and in the second state, the extending direction of the base is staggered to the second axis or parallel to the second axis.

5. The stand device as claimed in claim 1, wherein the extending direction of the supporting component is parallel to the first direction, in the first state, the extending direction of the base and the extending direction of the carrying component are both parallel to the first direction, and in the second state, the extending direction of the base is staggered to the first direction or perpendicular to the first direction, and the extending direction of the carrying component is perpendicular to the first direction.

6. The stand device as claimed in claim 1, wherein in the second state, the extending direction of the carrying component is perpendicular to the extending direction of the supporting component.

7. The stand device as claimed in claim 1, wherein the carrying component comprises:
a rotating sliding element, pivotally disposed to the supporting component along the second axis, and slidably disposed to the supporting component in the first direction, wherein the bump is disposed on the rotating sliding element; and
a carrying element, slidably disposed to the rotating sliding element in a second direction.

8. The stand device as claimed in claim 7, wherein the second direction is perpendicular to the second axis, in the first state, the second direction is perpendicular to the first axis and parallel to the first direction, and in the second state, the second direction is parallel to the first axis and perpendicular to the first direction.

9. The stand device as claimed in claim 8, wherein the carrying component further comprises:
a sliding rail, disposed on the rotating sliding element; and
a sliding block, disposed on the carrying element, and slidably disposed in the sliding rail in the second direction.

10. The stand device as claimed in claim 9, wherein the carrying component comprises a first positioning portion disposed on the sliding block, and the at least one electronic apparatus comprises a second positioning portion matched with the first positioning portion.

11. The stand device as claimed in claim 9, wherein in the second state, the at least one electronic apparatus is carried on the carrying element, the supporting component rotates along the first axis so that an angle of the at least one electronic apparatus relative to the base is adjusted, the rotating sliding element slides up and down relative to the supporting component in the first direction so that a height of the at least one electronic apparatus relative to the base is adjusted, and the carrying element slides left and right relative to the rotating sliding element in the second direction so that a horizontal position of the at least one electronic apparatus relative to the rotating sliding element is adjusted.

12. The stand device as claimed in claim 1, further comprising:
a positioning mechanism, disposed between the supporting component and the carrying component, and configured to limit rotation of the carrying component relative to the supporting component along the second axis and sliding of the carrying component relative to the supporting component in the first direction.

13. The stand device as claimed in claim 12, wherein the positioning mechanism comprises:
two toothed portions, disposed at two opposite sides of the sliding groove;
two latches, disposed at the bump, and configured to extend to be engaged with the two toothed portions or retract to release engagement with the two toothed portions; and
an actuator, slidably disposed to the carrying component, configured to actuate the two latches to extend or retract.

* * * * *